US012556878B2

(12) United States Patent
Murgai et al.

(10) Patent No.: US 12,556,878 B2
(45) Date of Patent: Feb. 17, 2026

(54) DETERMINING A VIRTUAL LISTENING ENVIRONMENT

(71) Applicant: Apple Inc., Cupertino, CA (US)

(72) Inventors: Prateek Murgai, San Francisco, CA (US); John E. Arthur, Santa Clara, CA (US); Joshua D. Atkins, Los Angeles, CA (US); Juha O. Merimaa, San Mateo, CA (US); Dipanjan Sen, Dublin, CA (US); Brandon J. Rice, Pacifica, CA (US); Alexander Singh Alvarado, San Jose, CA (US); Jonathan D. Sheaffer, San Jose, CA (US); Benjamin Bernard, Monaco (MC); David E. Romblom, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 712 days.

(21) Appl. No.: 17/821,022

(22) Filed: Aug. 19, 2022

(65) Prior Publication Data

US 2023/0104111 A1 Apr. 6, 2023

Related U.S. Application Data

(60) Provisional application No. 63/246,484, filed on Sep. 21, 2021.

(51) Int. Cl.
*H04S 7/00* (2006.01)

(52) U.S. Cl.
CPC .................................... *H04S 7/304* (2013.01)

(58) Field of Classification Search
CPC ........ H04S 7/304; H04S 7/40; H04S 2420/01; H04S 7/306; H04S 2400/11; H04M 3/568
(Continued)

(56) References Cited

U.S. PATENT DOCUMENTS 3,270,833 A 9/1966 Schroeder
4,389,892 A 6/1983 Niimi et al.
(Continued)

FOREIGN PATENT DOCUMENTS

CA 2628524 C 2/2014
EP 2930954 A1 10/2015
(Continued)

OTHER PUBLICATIONS

Li, Yan, et al., "Spatial Sound Rendering Using Measured Room Impulse Responses," 2006 IEEE International Symposium on Signal Processing and Information Technology, Sep. 2006, pp. 432-437.

(Continued)

*Primary Examiner* — Xu Mei
(74) *Attorney, Agent, or Firm* — Aikin & Gallant, LLP

(57) ABSTRACT

One or more acoustic parameters of a current acoustic environment of a user may be determined based on sensor signals captured by one or more sensors of the device. One or more preset acoustic parameters may be determined based on the one or more acoustic parameters of the current acoustic environment of the user and an acoustic environment of an audio file comprising audio signals that is determined based on the audio signals of the audio file or metadata of the audio file. The audio signals may be spatially rendered by applying spatial filters that include the one or more preset acoustic parameters to the audio signals, resulting in binaural audio signals. The binaural audio signals may be used to drive speakers of a headset. Other aspects are described and claimed.

20 Claims, 8 Drawing Sheets

(58) Field of Classification Search
USPC ............ 381/63, 26, 74, 303, 57, 91, 92, 122
See application file for complete search history.

(56) References Cited

U.S. PATENT DOCUMENTS

| | | | |
|---|---|---|---|
| 7,580,530 B2 | 8/2009 | Konagai et al. | |
| 9,479,867 B2 | 10/2016 | Li | |
| 9,581,530 B2 | 2/2017 | Guthrie et al. | |
| 10,187,740 B2 | 1/2019 | Family | |
| 10,388,268 B2 | 8/2019 | Leppanen et al. | |
| 10,455,325 B2 | 10/2019 | Woodruff et al. | |
| 10,582,299 B1 | 3/2020 | Mansour et al. | |
| 10,674,307 B1 * | 6/2020 | Robinson | H04S 7/304 |
| 10,921,446 B2 | 2/2021 | Sipko et al. | |
| 11,252,497 B2 * | 2/2022 | Yang | H04R 1/1083 |
| 11,301,202 B2 * | 4/2022 | Chen | A63F 13/54 |
| 12,112,521 B2 * | 10/2024 | Walsh | G06V 20/64 |
| 2012/0101609 A1 | 4/2012 | Supper et al. | |
| 2013/0272527 A1 | 10/2013 | Oomen et al. | |
| 2015/0163593 A1 | 6/2015 | Florencio et al. | |
| 2015/0373477 A1 * | 12/2015 | Norris | H04M 1/605 381/303 |
| 2016/0109284 A1 | 4/2016 | Hammershoi et al. | |
| 2017/0078820 A1 | 3/2017 | Brandenburg et al. | |
| 2017/0339504 A1 | 11/2017 | Bharitkar et al. | |
| 2018/0091919 A1 | 3/2018 | Chon et al. | |
| 2018/0197551 A1 | 7/2018 | McDowell et al. | |
| 2019/0103848 A1 * | 4/2019 | Shaya | H04R 1/403 |
| 2019/0327575 A1 | 10/2019 | Brown et al. | |
| 2020/0186912 A1 * | 6/2020 | Essid | H04R 1/1091 |
| 2020/0196087 A1 | 6/2020 | Schmidt et al. | |
| 2020/0225344 A1 | 7/2020 | Yoon et al. | |
| 2021/0287651 A1 | 9/2021 | Eronen et al. | |
| 2023/0062634 A1 | 3/2023 | Murgai et al. | |

FOREIGN PATENT DOCUMENTS

| | | |
|---|---|---|
| WO | 2016109065 A1 | 7/2016 |
| WO | 2020197839 A1 | 10/2020 |
| WO | 2022042864 A1 | 3/2022 |

OTHER PUBLICATIONS

Murgai, Prateek, et al., "Blind Estimation of the Reverberation Fingerprint of Unknown Acoustic Environments," Audio Engineering Society Convention Paper 9905 Presented at the 143rd Convention, Oct. 18-21, 2017, 6 pages.

* cited by examiner

DETERMINING A VIRTUAL LISTENING ENVIRONMENT

CROSS-REFERENCE TO RELATED APPLICATION

This application claims the benefit of U.S. Provisional Patent Application No. 63/246,484 filed Sep. 21, 2021, which is incorporated by reference herein in its entirety.

BACKGROUND

Content creators may create an audio or audio visual work. The audio may be fine-tuned precisely to the taste of the content creator in order to deliver a specific experience to a listener. The content creator may craft the audio so that it carries with it, perceivable cues of a particular scene, for example, an echoing outdoor mountainside, a stadium, or a small enclosed space. An audio work that is recorded outdoor may have perceivable acoustic cues that transports the listener to the outdoor environment. Similarly, if an audio work is recorded in a chamber, the listener may be virtually transported to the chamber.

A user may listen to an audio work in various location. Each location can have a different acoustic environment. For example, a user can listen to an audio or audio visual work in a car, on a grass field, in a classroom, on a train, or in the living room. Each acoustic environment surrounding a user may carry with it expectations of how sound is to be heard, even if the sound is being produced by headphones worn by a user.

SUMMARY

In one aspect, a method, performed by a processor, includes determining one or more acoustic parameters of a current acoustic environment of a user, based on sensor signals captured by one or more sensors of the device. One or more preset acoustic parameters are determined based on the one or more acoustic parameters of the current acoustic environment of the user and an acoustic environment of an audio file comprising audio signals that is determined based on the audio signals of the audio file or metadata of the audio file. The audio signals are spatially rendered by applying the one or more preset acoustic parameters to the audio signals, resulting in binaural audio signals. The binaural audio signals can be used as input to drive speakers. In such a manner, a compromise can be struck between the current acoustic environment of the user, and the acoustic environment of the audio file.

In one aspect, a method, performed by a processor of a device, includes determining whether an audio or an audio-visual file comprises metadata that includes an acoustic environment for playback. In response to the audio or the audiovisual file comprising the metadata that includes the acoustic environment, the processor spatially renders an audio signal associated with the audio or the audiovisual file according to the acoustic environment of the metadata. In response to the audio or the audiovisual file not comprising the metadata, the processor spatially renders the audio signal based on one or more acoustic parameters of a current environment of a user, a current scene of the audio or audiovisual file, and/or based on a content type of the audio or the audiovisual file. In such a manner, a content creator can exact controls over the acoustic environment through metadata, however, if the metadata is not present, then a compromise can be struck between the current acoustic environment of the user and the acoustic environment of the audio file.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
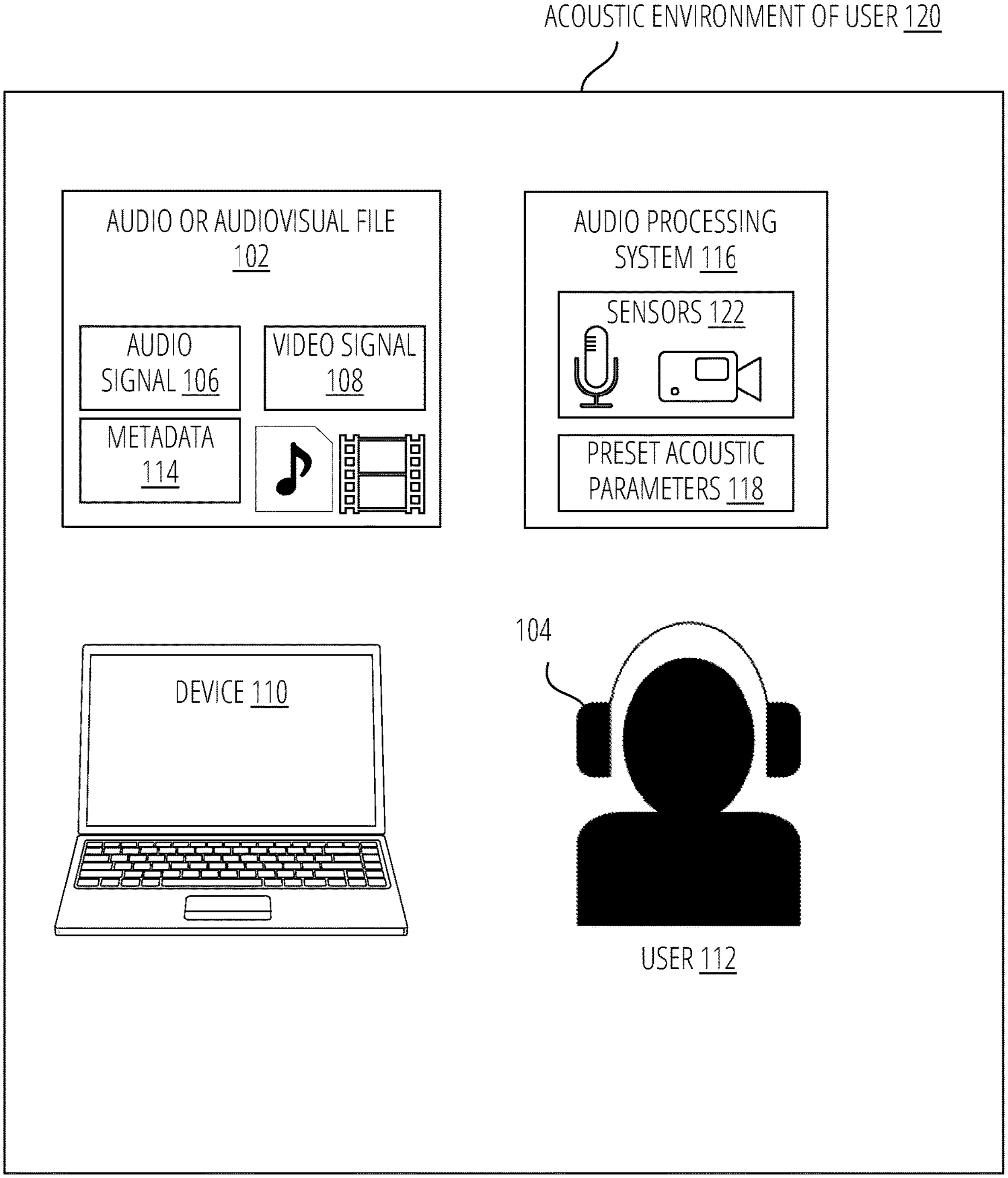
FIG. 1 illustrates audio processing of an audio or audio-visual file in accordance with some aspects.

Humans can estimate the location of a sound by analyzing the sounds at their two ears. This is known as binaural hearing and the human auditory system can estimate directions of sound using the way sound diffracts around and reflects off of our bodies and interacts with our pinna.

Microphones can sense sounds by converting changes in sound pressure to an electrical signal with an electro-acoustic transducer. The electrical signal can be digitized with an analog to digital converter (ADC). Audio can be rendered for playback with spatial filters so that the audio is perceived to have spatial qualities. The spatial filters can artificially impart spatial cues into the audio that resemble the diffractions, delays, and reflections that are naturally caused by our body geometry and pinna. The spatially filtered audio can be produced by a spatial audio reproduction system and output through headphones.

A spatial audio reproduction system with headphones can track a user's head motion. Binaural filters can be selected based on the user's head position, and continually updated as the head position changes. These filters are applied to audio to maintain the illusion that sound is coming from some desired location in space. These spatial binaural filters are known as Head Related Impulse Responses (HRIRs).

The ability of a listener to estimate distance (more than just relative angle), especially in an indoor space, is related to the level of the direct part of the signal (i.e. without reflection) relative to the level of the reverberation (with reflections). This relationship is known as the Direct to Reverberant Ratio (DRR). In a listening environment, a reflection results from acoustic energy that bounces off one or more surfaces (e.g., a wall or object) before reaching a listener's ear. In a room, a single sound source can result in many reflections from different surfaces at different times. The acoustic energy from these reflections, which can be understood as reverberation, can build up and then decay over time.

Reverberation helps to create a robust illusion of sound coming from a source in a room. As such, the spatial filters and the binaural cues that are imparted into left and right output audio channels should include some reverberation. This reverberation may be shaped by the presence of the person and the nature of the room and can be described by a set of Binaural Room Impulse Responses (or BRIRs).

A robust virtual acoustic simulation (e.g., spatial audio) benefits greatly from virtualization of a room to induce a sense of sound externalization which can be understood as the sensation of sound not coming from the headphones, but from the outside world. Deciding on the acoustic parameters of the virtual room is important to provide a convincing spatial audio experience.

Generally, the more the virtual room resembles the acoustics of the real room in which the person is operating, the more plausible the sense of externalization would be. However, when reproducing pre-recorded audio content such as a movie, a podcast, music, or other content, using spatial audio, emulating the real room can be detrimental to the experience because the acoustics of the virtual room may over-power or create a perceived discrepancy from the acoustics of the recorded content. A typical example of this is an outdoor movie scene, in which a user may expect to hear no or little reverberation, but due to virtualization, the user may hear a significant amount of reverberation from the virtual room. In such cases, a trade-off or compromise can be made between reproduction plausibility (which aids in externalization and envelopment) and reproduction fidelity (which maintains the viewing experience as intended by the content creator).

In some aspects, a system may select an optimal virtual room preset or parameters of a reverberation algorithm based on analysis and/or a priori knowledge of the acoustics of the real room and the acoustics of the content being played-back.

FIG. 1 illustrates audio processing of an audio or audiovisual file in accordance with some aspects. An audio processing system 116 can include sensors 122 such as a microphone, a camera, or other sensor that can characterize an acoustic environment 120 of a user 112. The audio system processing system can be integrated within a device such as, for example, a headset 104, and/or other computing device 110. In some aspects, the computing device can be a laptop, mobile phone, tablet computer, smart speakers, media player, or other computing device. The computing device can include a display. In some aspects, the audio processing system can be distributed among more than one computing device. The audio processing system can sense the acoustic environment of the user. For example, the audio processing system can be integrated within device 110 or 104 that is present in a grass field outdoors, or in a living room with a user. The sensors 122 can generate a microphone signal that carries with it sensed sounds and acoustic properties of the space.

An audio file 102 may include an audio signal 106 and metadata 114. In some aspects, the audio file can be an audiovisual file that also includes a video signal 108. An audio processing system 116 may determine preset acoustic parameters 118 that are to be applied to spatially render the audio signal 106. The preset acoustic parameters can be determined or selected as a compromise between the acoustic environment of the user, and the acoustic environment of the audio file.

The audio processing system 116 can determine one or more acoustic parameters of the current acoustic environment of a user based on the microphone signal, video signal, or other sensed data. The audio processing system can apply one or more audio processing algorithms to the microphone signal to extract the acoustic parameters of the user's environment. These acoustic parameters can include at least one of a reverberation time, a direct to reverberant ratio (DRR), a reflection density, envelopment, or speech clarity that may be specific to the user's current environment. Thus, if the user relocates to a new space, these acoustic parameters may be updated to characterize a new acoustic environment of the user. Such acoustic parameters can be determined repeatedly such as periodically or in response to a change in the environment, to update how the audio is spatialized in a manner that responds to real-time changes to the environment of the user.

The audio processing system can determine or select one or more preset acoustic parameters 118 based on different factors such as the one or more acoustic parameters of the current acoustic environment of a user, and an acoustic environment of the audio file 102. In some cases, the acoustic environment of the audio file may be artificially authored, for example, using software. The audio file or audiovisual file 102 can include, for example, a song, a podcast, a radio show, a movie, a show, a recorded concert, a videogame, or other audio or audiovisual work. Different acoustic environments can have different acoustic parameters such as reverberation, DRR, echo, a reflection density, envelopment, or speech clarity. For example, audio signal 106 can be recorded in an acoustic environment such as an outdoor setting, an indoor setting, a cathedral, a closet, other acoustic environment, each having unique acoustic characteristics.

The acoustic environment of the audio file, which can be referred to as the content-based acoustic environment, may be determined based on the audio signals of the audio file or metadata of the audio file. The audio processing system 116 can apply one or more algorithms to the audio signal 106 to extract the acoustic parameters of audio signal 106. The audio processing system can classify the acoustic environment that the audio signal 106 was recorded in (or artificially created with). For example, the audio processing system may classify the file's acoustic environment as 'outdoors' or 'indoors'. The acoustic environment can be classified with more granularity, for example, the acoustic environment of the audio file can be classified as a 'large room', 'medium-room', or 'small-room'. The acoustic environment of the audio file can change from one scene to another. For example, at a beginning of the audio file, the scene may be outdoors. The scene may shift to become indoors in the middle of the audio file, and then back to being outdoors again. Similarly, the scene can change from one indoor room to a different room having a different geometry, size, and/or damping surfaces.

An audio file or audiovisual file can include metadata 114 that can describe one or more scenes of the work. This scene may change throughout the course of the work. For example, metadata may specify a first scene as 'outdoor' and a second scene as 'indoor'. The audio processing system 116 may read the metadata to classify the acoustic environment of the audio file. For example, if metadata states that the current scene is 'outdoor', then the content-based acoustic environment can be classified as 'outdoor'. If metadata states that the current scene is 'indoor', then the content-based acoustic environment can be classified as 'indoor'. If metadata states that the current scene is 'bedroom', then the content-based acoustic environment can be classified as 'bedroom'. In some aspects, metadata may specify that the current scene is to be 'acoustic environment of the user 112', in which case the audio processing system can determine the user's acoustic environment from the microphone signal or other sensor data, as described. In some aspects, the metadata may include one or more preset acoustic parameters 118 for the audio processing system to use, which may also change according to scene.

In some aspects, the audio processing system may analyze the video signal 108 to determine the content-based acoustic environment. For example, the audio processing system may analyze the video using computer vision (e.g., a trained machine learning algorithm) to determine if the content is showing an outdoor scene or an indoor scene, a large room, a medium room, a small room, a stadium, or other acoustic environment. Similarly, the audio processing system may apply a computer vision algorithm to images to determine an acoustic environment of the user 112.

The audio processing may select or determine preset acoustic parameters 118 based on the acoustic environment of the user 112, and the content-based acoustic environment, which as described, can be classified based on metadata 114, audio signal 106, and/or video signal 108. In some cases, the audio processing system may use preset acoustic parameters that more closely resemble the content-based acoustic environment, while in other cases, the audio processing system may use preset acoustic parameters that more closely resemble the acoustic environment of user 120. This can depend on various factors, as described further in other sections.

In some aspects, the audio processing system may first scan for metadata that indicates the content-based acoustic environment. If such metadata is present, then the audio processing can determine the preset acoustic parameters based on the metadata. If not, the audio processing system can fall back on analyzing the audio signal 106 and/or video signal 108, to determine the preset acoustic parameters.

The audio processing system can spatially render the one or more audio signals, which can include applying the one or more preset acoustic parameters to the audio signals. For example, the audio processing system can convolve the audio signal with spatial filters that characterize a head related transfer function (HRTF). Those spatial filters can include the preset acoustic parameters, such as reverberation time, a DRR, or other preset acoustic parameters. The audio processing system can drive speakers of a headset 104 with the resulting binaural audio signals.

Figure 2:
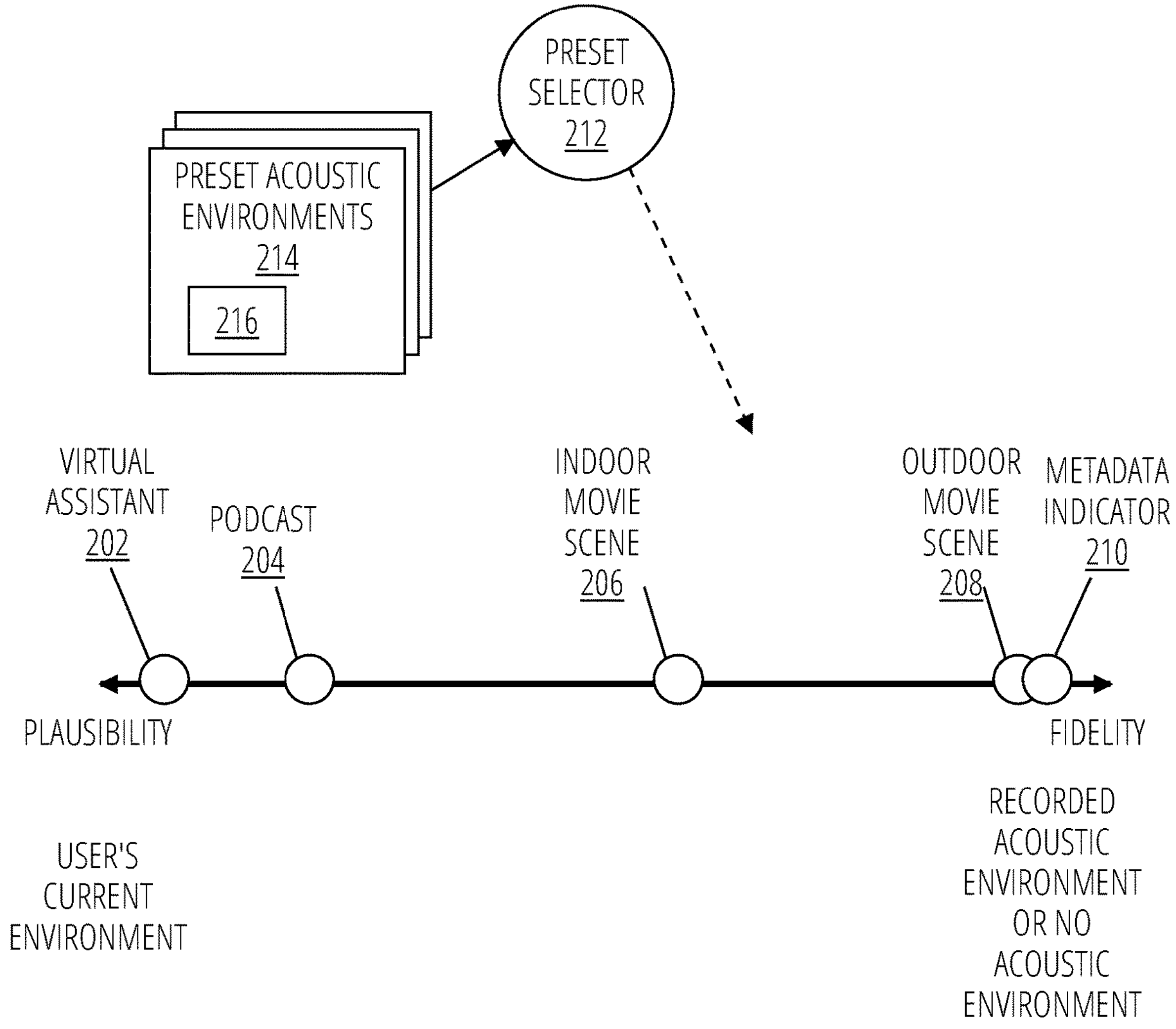
FIG. 2 illustrates selection of acoustic parameters for audio processing in accordance some aspects.

FIG. 2 illustrates a system for selection of acoustic parameters for audio processing in accordance some aspects. As discussed, a trade-off or compromise may be struck between reproduction plausibility and reproduction fidelity. The more externalized and enveloped a user becomes in audio, the more plausible or convincing the spatial reproduction is to the user. Such a rending, however, may not be in accord with an intended acoustic scene. A preset selector 212 can determine a tradeoff between making the spatial audio plausible, and maintaining the original viewing experience as intended by the content creator.

A preset selector 212 can determine one or more preset acoustic parameters 216. Preset acoustic parameters can be associated with each of a plurality preset acoustic environments 214. The preset acoustic environments can be stored and accessible in a computer readable medium. This library of preset acoustic environments can include a variety of environments such as, for example, a large room, a small room, rooms having different geometry, rooms with different surface absorption surfaces, rooms with various arrangements of objects (e.g., furniture), an outdoor space, and outdoor space with echo, a cathedral, a stadium, a library, a living room, a bedroom, or other acoustic environment. The preset acoustic environments can be determined at an earlier time, stored in memory, and called upon when processing an audio file. Each of the preset acoustic environments can include corresponding preset acoustic parameters. For example, a large room may have a long reverberation time, and a small room may have a short reverberation time. The preset selector may select a preset acoustic environment 214, or select the preset acoustic parameters 216 directly. In some aspects, rather than selecting a preset acoustic environment, the preset selector can generate a room model that models a desired acoustic environment based on analysis of the user's acoustic environment and/or analysis of the audio or video signals of the content. This desired acoustic environment can be used in place of the preset acoustic environment, or may be used to inform selection of the preset acoustic environment.

The preset selector can determine or select the preset acoustic parameters to increase resemblance to the acoustic environment of the audio file in response to the acoustic environment of the audio file being an outdoor scene. On the other hand, the preset selector can select the preset parameters to increase resemblance to the current acoustic environment of the user in response to the acoustic environment of the audio file being indoors or non-existent.

For example, if a user is listening to an audio file that is recorded outdoors, the intent of the creator may be to have the user experience the sound as if the scene is outside. As such, the preset selector may reduce the 'room effect' applied to the audio file. If, however, the scene of the audio file changes to an indoor setting, then the preset selector can increase the 'room effect' to improve plausibility of the spatial rendering. This can be done with less regard to the intended audio scene because the indoor scene of the audio file may be perceptually similar to the user's acoustic environment (e.g., a living room). As shown in the line graph, the preset selector may select preset acoustic parameters for an indoor movie scene 206 with more emphasis on plausibility (further to the left), and an outdoor movie scene 208 with more emphasis fidelity (further to the right). The 'room effect' can be understood as artificially applying acoustic parameters of a virtual room, where this virtual room may resemble the user's actual acoustic environment.

The preset selector may select the preset acoustic parameters 216 to have increased resemblance to the acoustic environment of the audio file in response to an indicator 210 in the metadata of the audio file. For example, metadata may include a control such as a value that, at one end, shuts off the 'room effect' entirely such that the audio is spatially rendered with the recorded acoustic environment without added reverberation or other artificially added acoustic environment. On the other end of the value, a preset acoustic environment can be selected to have increased resemblance to the user's current environment. In some aspects, the control can be a binary value that either turns off the 'room effect' completely so that the recorded acoustic environment is spatialized with no additional acoustic environment being applied to the audio file.

In some aspects, acoustic parameters may be specified in the metadata of the audio file. If the acoustic parameters are present in metadata, then the preset selector can apply these metadata acoustic parameters as the preset acoustic parameters 216 to the audio file. If there are acoustic parameters and a control in the metadata, the control may indicate conditions in which these acoustic parameters are to be applied, such as for specific scenes, at specific times.

In some aspects, the preset selector may select the preset parameters to increase resemblance to the acoustic environment of the audio file, in response to the audio file being associated with a visual work. On the other hand, the preset selector may select the preset parameters to increase resemblance to the current acoustic environment of the user in response to the audio file not being associated with a visual work.

For example, as shown in the bar graph if the audio file is an audio visual file such as a movie, this may bias the preset selector towards fidelity. The preset selector can select the preset parameters with less of a 'room effect' for indoor movie scene 206 than for a podcast 204 or for a virtual assistant virtual 202. Although podcasts may be recorded in an acoustic environment, this is typically an artifact of the recording process rather than an intended acoustic effect of the creator. Thus, the preset selector may select the preset parameters with emphasis on plausibility with minimal impact to the podcast experience. A virtual assistant, on the other hand, may include artificially generated speech that does not have an acoustic environment. As such, the preset selector may select preset acoustic parameters with complete emphasis on plausibility. In some aspects, one or more acoustic parameters of the user's current acoustic environment can be determined, and those acoustic parameters can be applied to produce a 'room effect'.

The preset selector may apply or adjust a weight or other control parameter to bias selection of the preset acoustic parameters towards resembling the acoustic environment of the audio file or towards resembling the acoustic environment of the user. For example, increasing or decreasing the control parameter can bias selection of the preset acoustic parameters 216 or a preset acoustic environment 214 towards plausibility. Decreasing or increasing the control parameter can bias the selection towards fidelity. Control parameters can be applied in a linear or non-linear manner to bias the selection as desired.

Figure 3:
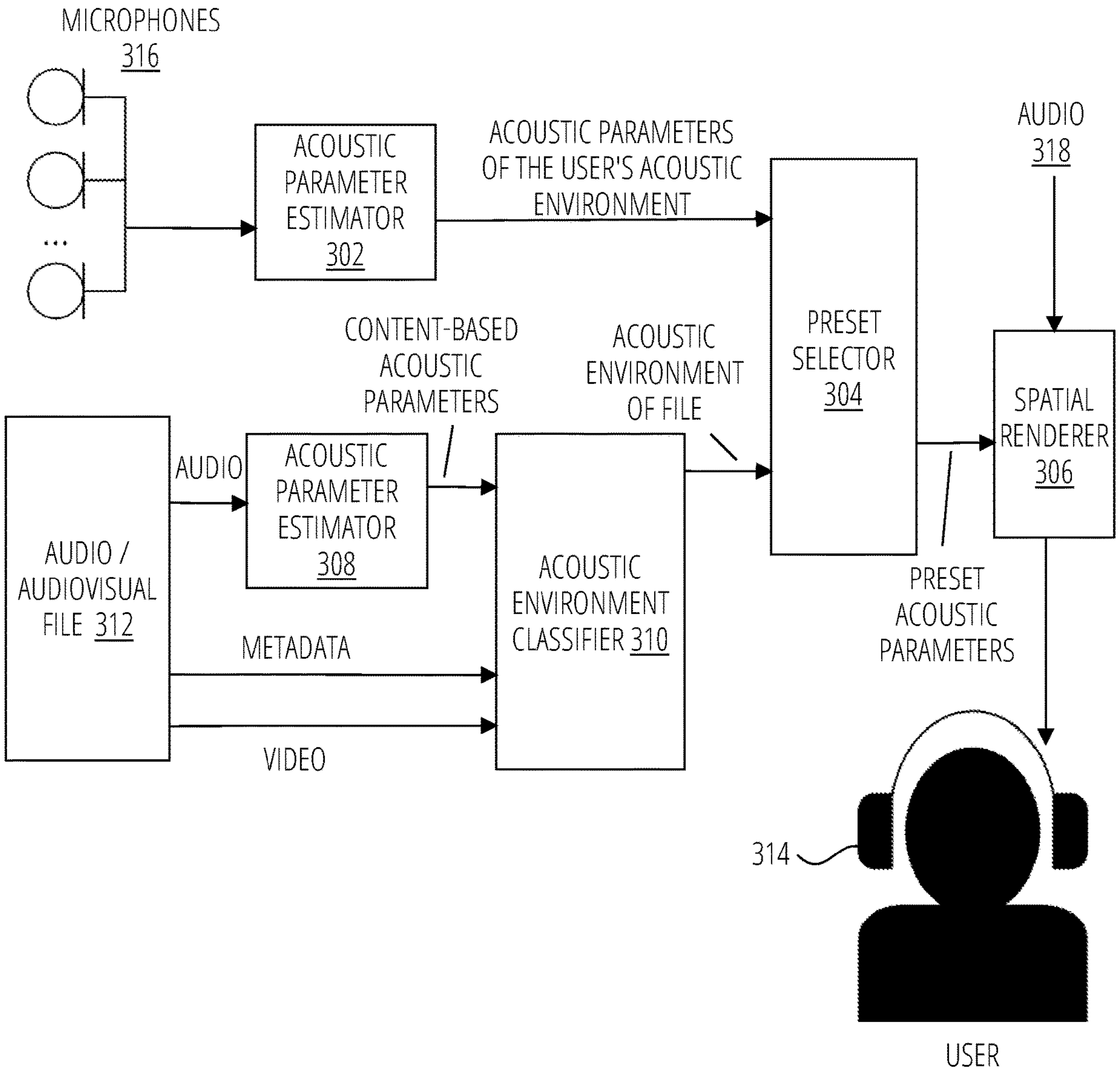
FIG. 3 illustrates a workflow for determining and applying preset acoustic parameters in accordance with some aspects.

FIG. 3 illustrates a workflow for determining and applying preset acoustic parameters in accordance with some aspects. One or more microphones 316 can generate respective microphone signals. The one or more microphones can be integrated within a computing device. In some aspects, the one or more microphones can be integrated in a common device with speakers 314. Speakers 314 can be head worn speakers, or one or more loudspeakers.

Acoustic parameter estimator 302 can determine one or more acoustic parameters of a current acoustic environment of a user, based on microphone signals captured by one or more microphones. The acoustic parameters can include one or more of a reverberation time (e.g., T60, T30, etc.), a direct to reverberant ration (DRR), reflection density, envelopment, a speech clarity, or other acoustic parameter.

In some aspects, the acoustic parameter estimator may apply a machine learning model (e.g., a neural network or other machine learning algorithm) to the microphone signals to determine the acoustic parameters of the current acoustic environment of the user. A neural network or other machine learning model may be trained with existing datasets so that the model can extract the acoustic parameters with minimal error.

Additionally, or alternatively, the acoustic parameter estimator 302 may determine the one or more acoustic parameters of the current acoustic environment of the user using a digital signal processing algorithm such as a blind room estimation algorithm, beamforming, or a frequency domain adaptive filter (FDAF). Blind room estimation can be understood as estimating acoustic parameters of a space using a recording of the reverberated signal, such as without using the original transmitted signal and without generating artificial test stimuli to analyze a response of a space. Thus, a blind room estimation algorithm can be applied to the microphone signals to determine acoustic parameters of the space that the microphone is located, which can be presumed to be the space in which the user is located. Beamforming can include applying phase shifts to microphone or audio signals to create constructive and destructive interference, thereby emphasizing acoustic pickup in some directions and de-emphasizing acoustic pickup in other directions. A frequency domain adaptive filter can include filtering of the microphone signals, error estimation, and tap-weight adaption based on the error estimation. Other digital signal processing algorithms can be used to estimate the acoustic parameters of the user's environment.

Similarly, acoustic parameter estimator 308 may apply a digital signal algorithm or a machine learning model (as described with respect to block 302) to one or more audio signals of an audio file 312 to determine content-based acoustic parameters. It should be understood that for the present disclosure, an audio file is interchangeable with an audiovisual file. Content-based acoustic parameters can be understood as acoustic parameters of the acoustic environment in which the audio signal was recorded. In some aspects, the acoustic environment of the content may be artificially altered by a creator, for example, in post-production. Regardless, the audio signal may carry acoustic parameters that serve as perceivable cues of the acoustic environment of the content. For example, if the scene of the audio file is a concert hall, there may be a long reverberation time and acoustic energy being strong in many directions. In such a case, the estimator 308 may determine the RT60 (which would be relatively long), the DRR (which would be relatively low), envelopment (which would be relatively high), or other content-based acoustic parameters from the audio signals.

In some aspects, the metadata may include content-based acoustic parameters of a scene. The acoustic environment classifier 310 may scan the metadata or the preset selector can select these content-based acoustic parameters directly and use them as the preset acoustic parameters that are to be applied to the audio signal.

An acoustic environment classifier 310 may classify an environment of the audio file based on the acoustic parameters or based on metadata. The acoustic environment of the audio file may be classified by a room volume (e.g., a large, medium, small room), being an open space (e.g., outdoors), or being an enclosed space (e.g., indoors). The acoustic environment may be classified with varying levels of granularity. In some aspects, the environment may be classified based on a type of space, such as, for example, a room, a library, a cathedral, a stadium, a forest, an open field, a mountain side, a valley, etc.

Metadata may indicate that the scene is 'outdoor', 'indoor', a large room, a medium room, a small room, a reverberant room, a concert hall, a library, or other acoustic environment. The acoustic environment classifier can classify the acoustic environment using the environment indicated in the metadata. If not present in the metadata, the classifier can determine the acoustic environment based on the content-based acoustic parameters. For example, if the RT60 is 'x' amount, and the DRR is 'y' amount, then the acoustic environment may be classified as a concert hall. If RT60 is 'a', and/or the DRR is 'b', then the acoustic environment may be classified as outdoor.

Preset selector 304 may determine one or more preset acoustic parameters based on the one or more acoustic parameters of current acoustic environment of a user determined at block 302 and/or an acoustic environment of an audio file that is determined based on audio signals of the audio file or metadata of the audio file, as classified at block 310. In some aspects, the preset selector may use a rule-based algorithm that determines the preset acoustic parameters (or selects a preset acoustic environment that includes the preset acoustic parameters) based on a content-type, a scene-type, and the user's acoustic environment. For example, the preset selector may enforce a rule that states: if content type='movie', scene='outdoor', and acoustic parameters of the user's acoustic environment='reverberant', then set the preset acoustic parameters as 'low reverberation'. In some aspects, the preset selector can generate a room model to create a desired virtual acoustic environment. A room model can include parameters, algorithms, and/or mathematical relationships that define acoustic behavior such as, for example, reverberation time, impulse response, or acoustic parameters. Estimation results of the user's acoustical environment (from block 302) and estimation results of the content (from block 308) can include parameters of the room model such as, for example, room size and/or absorption of the simulated surfaces. Reverberation time and/or other acoustic parameters can be derived from relationships between room size (e.g., volume), absorption, and reverberation time. For example, T=0.16 V/A where T represents reverberation time, V represents room volume, and A represents a total sound absorption of the room. A room model can include other relationships from which the acoustic parameters are derived based on control parameters. These acoustic parameters can be used as the preset acoustic parameters.

Additionally, or alternatively, the preset selector may use a data driven algorithm such as a trained neural network or other trained machine learning model. The data driven algorithm can select one or more preset acoustic parameters from a large pool of data. The machine learning model may be trained such that, when applied to a content-type, an audio scene type, and/or the one or more acoustic parameters of the user's environment, the model may output the preset acoustic parameters with minimal error.

As such, the system may classify an acoustic environment of the audio file (at block 310) and selecting the preset acoustic parameters (at block 304) as a balance or compromise between the acoustic environment of the audio file and the one or more live acoustic parameters. The user's 'room effect' may be added in some cases such as in indoor scenes, for strictly audio content, or where there the audio does not have an acoustic environment of its own. In other cases, such as a movie, or where the content creator has specified so in metadata, the user's 'room effect' can be turned down or off. The system may take in the different parameters such as the metadata, the acoustic environment of the audio, and the acoustic environment of the user, and determine or select an optimal acoustic scene.

In some aspects, the acoustic environment classifier 310 may classify a space based on a video signal of the audio or audiovisual file 312. For example, the classifier may include a computer vision algorithm that can determine whether the scene is an outdoor scene or an indoor scene.

In some aspects, the one or more acoustic parameters of current acoustic environment of a user can be stored and re-used at a later time. For example, the user may watch a show (e.g., an audiovisual file) thereby triggering the workflow shown in FIG. 3. The reverberation time and/or DRR of a user's living room may be stored in a computer-readable medium at block 302. The following day, when the user returns to the living room and listens to a podcast, a device such as a smart phone or speakers 314 may sense that the user is in the same acoustic environment—the living room. The stored reverberation time and/or DRR may be re-used for spatializing the podcast, so that they need not be recalculated.

Spatial renderer 306 may apply spatial filters to one or more audio signals 318. The spatial renderer may convolve the one or more audio signals with the spatial filters to produce the resulting spatialized audio channels. The resulting spatialized audio channels can be used to drive speakers 314. Speakers 314 may include a left speaker and a right speaker that are worn in or on a user's ear. In some aspects, speakers 314 may include one or more speaker arrays which can be integral to one or more loudspeaker cabinets. The spatial renderer may select the spatial filters based on the preset acoustic parameters so that the spatial filters include the desired effect of the preset acoustic parameters, such as, for example, a desired reverberation time, DRR, envelopment, reflection density, envelopment, and/or speech clarity.

It should be understood that, although grouped as individual blocks to show a workflow, each of the processing blocks shown can be performed with an audio processing system or distributed among a plurality of audio processing systems that can communicate over a network. Some or all of the blocks may be combined as one or more other blocks.

Figure 4:
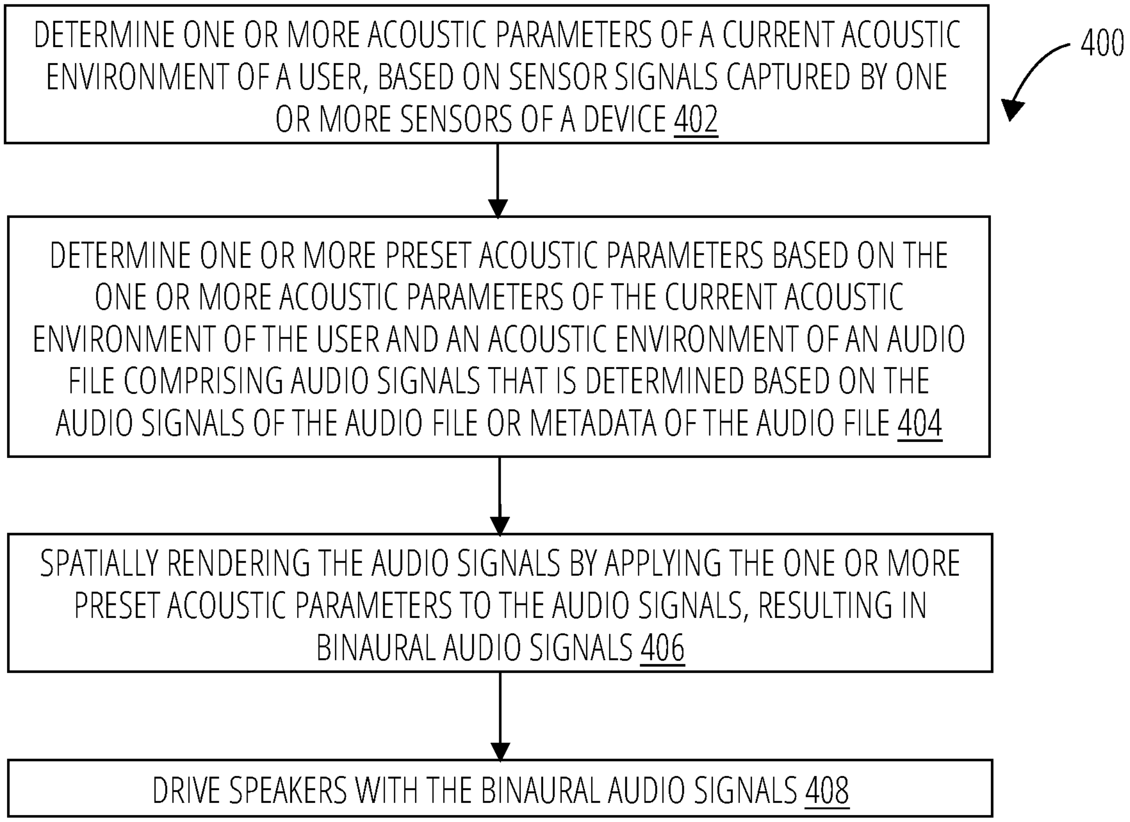
FIG. 4 illustrates a method for determining a preset acoustic parameter in accordance with some aspects.

FIG. 4 illustrates an audio processing method 400 in accordance with some aspects. The method 400 can be performed with various aspects described. The method may be performed by a device, hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. Although specific function blocks ("blocks") are described in the method, such blocks are examples. That is, aspects are well suited to performing various other blocks or variations of the blocks recited in the method. It is appreciated that the blocks in the method may be performed in an order different than presented, and that not all of the blocks in the method may be performed.

At block 402, a processor may determine one or more acoustic parameters of a current acoustic environment of a user, based on sensor signa ls captured by one or more sensors of the device. For example, the processor may apply a digital signal processing algorithm or machine learning algorithm to a microphone signal captured by a microphone, and/or a camera image captured by a camera, as described in other sections.

At block 404, the processor may determine one or more preset acoustic parameters based on the one or more acoustic parameters of the current acoustic environment of the user and an acoustic environment of an audio file comprising audio signals that is determined based on the audio signals of the audio file or metadata of the audio file.

For example, the processor may determine content-based acoustic parameters from the audio signal of the audio file. The processor may classify the environment of the audio file based on metadata or the content-based acoustic parameters. The preset selector may select the preset acoustic parameters based on the classification of the acoustic environment of the audio file, and the acoustic parameters of the user's acoustic environment. Other aspects are also described.

At block 406, the processor may spatially render the audio signals by applying the one or more preset acoustic parameters to the audio signals, resulting in spatialized audio signals. At block 408, the processor may drive speakers with the spatial audio signals.

Figure 5:
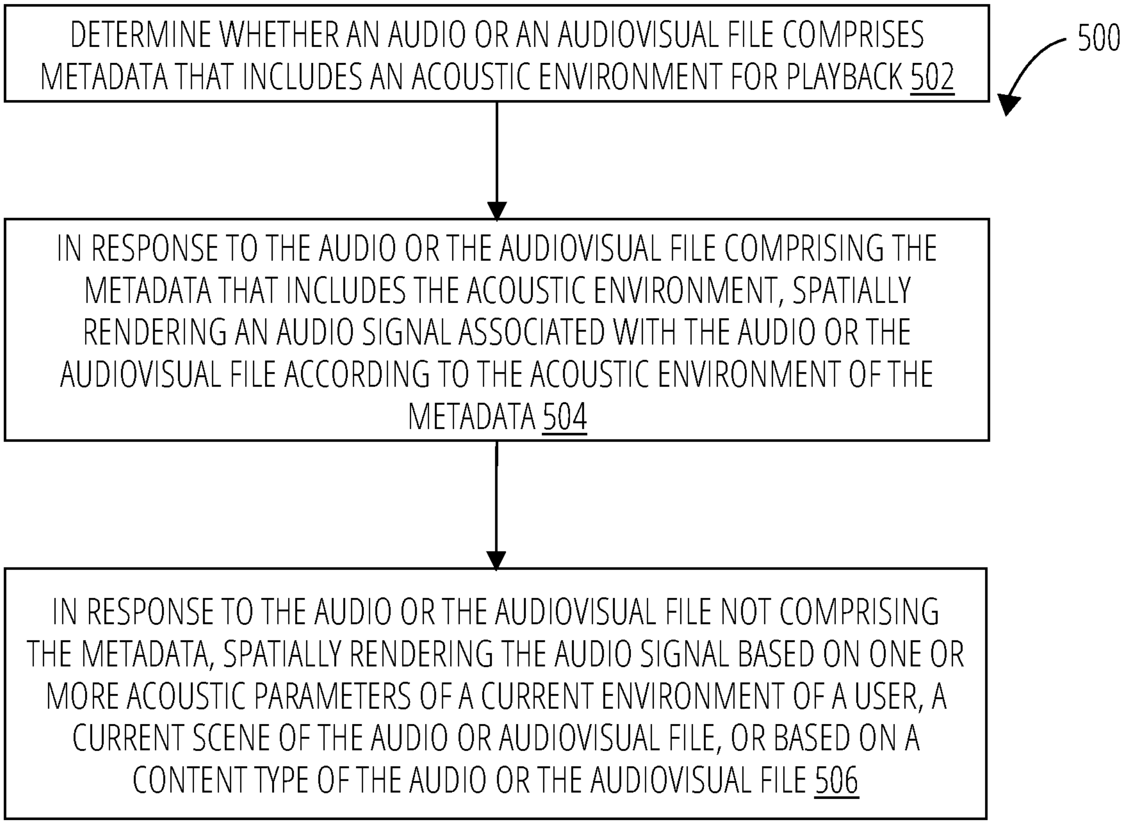
FIG. 5 illustrates a method for determining a preset acoustic parameter in accordance with some aspects.

FIG. 5 illustrates a method for determining a preset acoustic parameter in accordance with some aspects. The method 500 can be performed with various aspects described. The method may be performed by hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. Although specific function blocks ("blocks") are described in the method, such blocks are examples. That is, aspects are well suited to performing various other blocks or variations of the blocks recited in the method. It is appreciated that the blocks in the method may be performed in an order different than presented, and that not all of the blocks in the method may be performed.

In block 502, a processor may determine whether an audio or an audiovisual file comprises metadata that includes an acoustic environment or acoustic parameters for playback. For example, the processor can scan metadata to determine whether the acoustic environment or acoustic parameters are present.

In block 504, in response to the audio or the audiovisual file comprising the metadata that includes the acoustic environment or acoustic parameters, the processor may spatially render an audio signal associated with the audio or the audiovisual file according to the acoustic environment or the acoustic parameters of the metadata.

In block 506, in response to the audio or the audiovisual file not comprising the metadata, the processor may spatially render the audio signal based on one or more acoustic parameters of a current environment of a user, a current scene of the audio or audiovisual file, or based on a content type of the audio or the audiovisual file.

For example, in response to the current scene of the audio or audiovisual file being an outdoor scene, the audio signal may be spatially rendered with less similarity to the current environment of the user. On the other hand, in response to the current scene of the audio or audiovisual file being an indoor scene, the audio signal may be spatially rendered with more similarity to the current environment of the user.

In response to the content type of the audio or the audiovisual file being a movie, the audio signal may be spatially rendered with less similarity to the current environment of the user and with more similarity to acoustic parameters extracted from the audio signal or a video signal of the audio or the audiovisual file. On the other hand, in response to the content type of the audio or the audiovisual file being a podcast or talk show, the audio signal may be spatially rendered with more similarity to the current environment of the user.

Rendering of the audio signal can be biased to be more similar to the current environment (e.g., increased 'room effect') and less similar to the current environment (e.g., less 'room effect') by increasing or decreasing a weight or other control parameter, and/or by selecting preset acoustic parameters based on a particular order. For example, preset acoustic parameters may be ordered a grouped from along a sliding scale from plausibility to fidelity as shown in FIG. 2.

Figure 6:
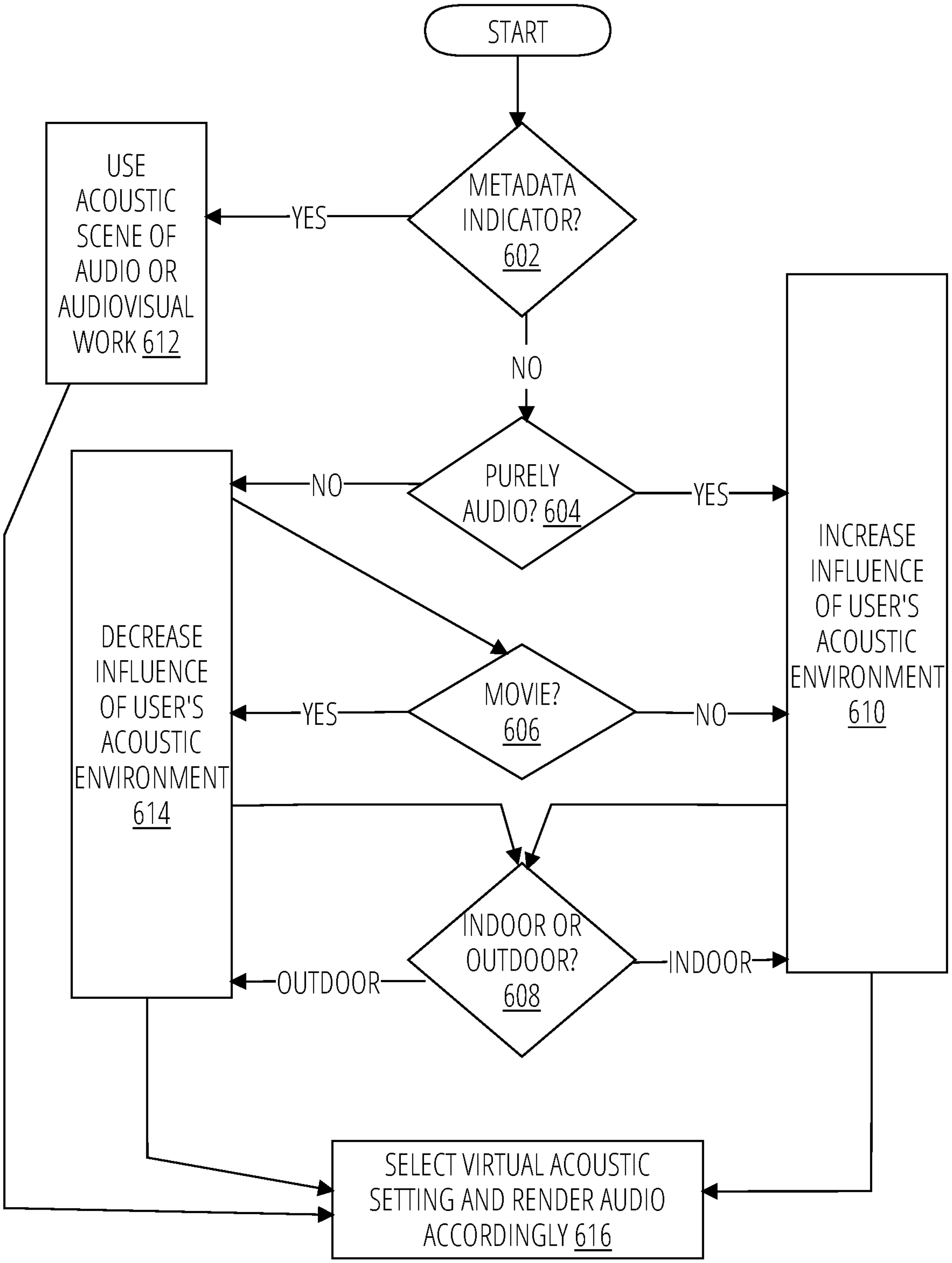
FIG. 6 illustrates audio processing operations for determining preset acoustic parameters in accordance with some aspects.

FIG. 6 illustrates audio processing operations in accordance with some aspects. The operations can be performed by an audio processing system with aspects described in other sections.

At block 602, an audio processing system may read metadata of an audio or audiovisual file and determine whether or not there is a control that specifies whether or not the original acoustic environment is to be preserved. The control may specify that no additional reverberation or other 'room effect' is to be added. The control, in some cases, may define the acoustic parameters that are to be applied during spatialization. Thus, at block 602, if the metadata includes a control or other indicator, the audio processing system may proceed to block 612 where it may use the acoustic environment or acoustic parameters specified in metadata or inherent in the audio signal of the audio file.

If metadata does not have any such indication, the audio processing system may proceed to block 604. If the audio file is purely an audio without a visual component, such as a podcast, talk show, music, or a virtual assistant, then the audio processing system can proceed to block 610 and increase influence of the user's acoustic environment. The audio processing system can proceed to block 608 and determine whether the audio file has an indoor or outdoor setting. This can be performed based on techniques such as, for example, digital signal processing, machine learning based techniques, or metadata, as described in other sections. If the audio file is determined to have an outdoor setting, then the audio processing system can proceed to block 614 and decrease influence of user's acoustic environment. If the audio file has an indoor setting, then the audio processing system can revisit block 610 and further increase the influence of the user's acoustic environment. Thus, pure audio files which may be intended to sound outdoors may have less of a room effect applied, while those that are recorded indoors may have more of a room effect applied.

If the audio file is not purely audio, the audio processing system can proceed to block 614 and decrease influence of the user's acoustic environment. The audio processing system can proceed to block 606. If the audiovisual file is a movie, then the audio processing system can revisit block 614 to further decrease influence of the user's acoustic environment. If the audiovisual file is not a movie, then the audio processing system can proceed to block 610 and increase influence of the user's acoustic environment.

The audio processing system can proceed to block 608. If the audiovisual scene is an outdoor scene, then the audio processing system can revisit block 614 further decrease influence of the user's acoustic environment. Otherwise, if it is an indoor movie scene, then the audio processing system can proceed to block 610 to increase influence of the user's acoustic environment. As discussed, one or more weights or other control parameters can be adjusted to either increase or decrease influence of the user's acoustic environment.

At block 608, the audio processing system can spatialize the audio using preset acoustic parameters determined based on the metadata or the user's acoustic environment in view of how much influence the user's acoustic environment should have (as determined as a result of the operations) in determining the preset acoustic parameters.

Figure 7:
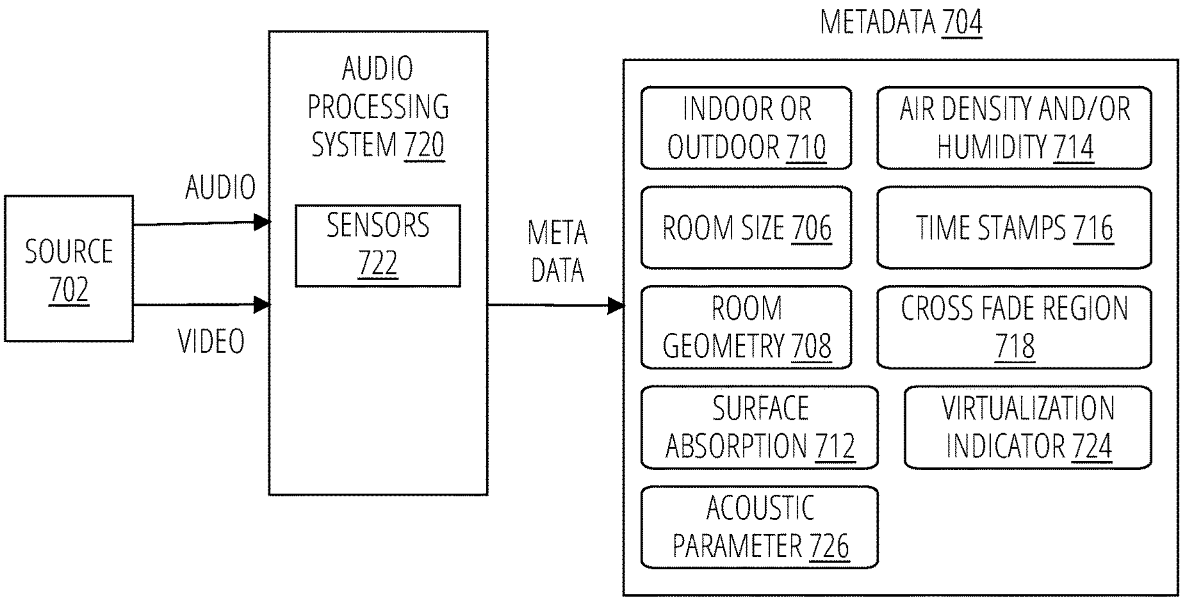
FIG. 7 illustrates metadata with acoustic parameters in accordance with some aspects.

FIG. 7 illustrates metadata 704 in accordance with some aspects. Metadata 704 can be integral to or associated with an audio or audiovisual file. As mentioned, an audio or audiovisual file may include a static file or a streamed data.

Metadata can include time stamps 716 that delineate the start and end of a scene. Each scene can have its own set of fields describing the acoustic environment of the scene. Cross-fade regions 78 can be specified for transitions between scenes. Further, metadata may include a virtualization indicator 724 which can include a control that indicates whether or not to apply a room effect to the audio. Such an indicator can be a binary value or other value that provides a sliding scale of how much influence the user's environment may have on the current audio or audiovisual work.

Metadata 704 may include various fields that may indicate an acoustic environment or acoustic parameters. For example, metadata can have a field 710 indicating whether a scene is indoor or outdoor. Metadata may specify a room size 706, a room geometry 708, and/or surface absorption 712 of various surfaces in the acoustic environment of a scene. Metadata may include the air density and/or humidity 714 within the acoustic environment. Metadata can include acoustic parameters 726 such as reverberation time, DRR, reflection density, envelopment, speech clarity, or other acoustic parameter.

In some aspects, and audio processing system 720 can author the metadata and associate or embed it with the audio or audiovisual file. The audio processing system may obtain the audio or audiovisual file from a source 702 which may be a capture device (e.g., a microphone and/or camera). In some aspects, the source 702 maybe a downstream device such as a computer used for post-production of the audio or audiovisual data.

In some aspects, the audio processing system may author the metadata in real-time, or while the scene is being captured by the capture device. The audio processing system 720 can, in some aspects, be integrated with the capture device. The audio processing system can include sensors 722 such as, for example, one or more microphones, a barometer, and/or cameras. The audio processing system apply a digital signal processing algorithm and/or a machine learning model to the audio signal or video of the audio file, or to the sensor data, to determine the metadata fields such as 706, 708, 710, 712, 714, and 726. A user may set the virtualization indicator 722, or the audio processing system may apply a rule-based or machine learning based algorithm to set the virtualization indicator field, like those described in other sections.

As such, an audio processing system may generate metadata 704 that is used by a downstream device (e.g., an audio processing system described in other sections) to determine when and what acoustic parameters are to be applied to the audio file. Metadata may explicitly indicate a desired acoustic environment, a desired mix of content-based acoustic environment and the user's acoustic environment, and/or other acoustic data (e.g., a room size, geometry, surface parameters, etc.) from which the acoustic setting can be inferred downstream.

In some aspects, a method, comprises: determine whether an audio or an audiovisual file comprises metadata that includes an acoustic environment for playback; in response to the audio or the audiovisual file comprising the metadata that includes the acoustic environment for playback, spatially rendering an audio signal associated with the audio or the audiovisual file according to the acoustic environment of the metadata; and in response to the audio or the audiovisual file not comprising the metadata, spatially rendering the audio signal based on one or more acoustic parameters of a current environment of a user, a current scene of the audio or audiovisual file, or based on a content type of the audio or the audiovisual file. In some aspects, in response to the current scene of the audio or audiovisual file being an outdoor scene, the audio signal is spatially rendered with less similarity to the current environment of the user. In some aspects, in response to the current scene of the audio or audiovisual file being an indoor scene, the audio signal is spatially rendered with more similarity to the current environment of the user. In some aspects, in response to the content type of the audio or the audiovisual file being a movie, the audio signal is spatially rendered with less similarity to the current environment of the user and with more similarity to acoustic parameters extracted from the audio signal or a video signal of the audio or the audiovisual file. In some aspects, in response to the content type of the audio or the audiovisual file being a podcast or talk show, the audio signal is spatially rendered with more similarity to the current environment of the user.

Figure 8:
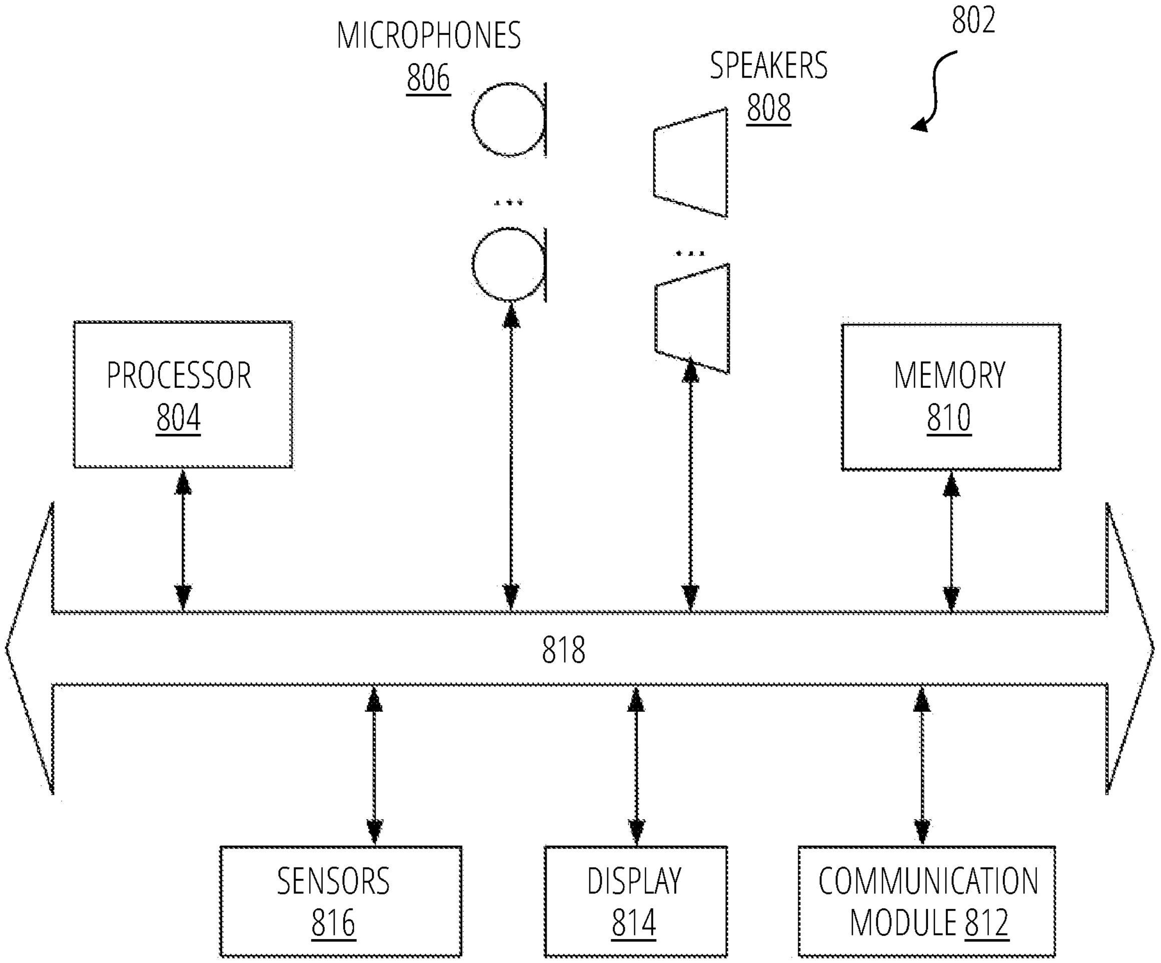
FIG. 8 illustrates an audio processing system in accordance with some aspects.

FIG. 8 illustrates an audio processing system in accordance with some aspects. The audio processing system can be a computing device such as, for example, a desktop computer, a tablet computer, a smart phone, a computer laptop, a smart speaker, a media player, a household appliance, a headphone set, a head mounted display (HMD), smart glasses, an infotainment system for an automobile or other vehicle, or other computing device. The system can be configured to perform the method and processes described in the present disclosure.

Although various components of an audio processing system are shown that may be incorporated into headphones, speaker systems, microphone arrays and entertainment systems, this illustration is merely one example of a particular implementation of the types of components that may be present in the audio processing system. This example is not intended to represent any particular architecture or manner of interconnecting the components as such details are not germane to the aspects herein. It will also be appreciated that other types of audio processing systems that have fewer or more components than shown can also be used. Accordingly, the processes described herein are not limited to use with the hardware and software shown.

The audio processing system can include one or more buses 818 that serve to interconnect the various components of the system. One or more processors 804 are coupled to bus as is known in the art. The processor(s) may be microprocessors or special purpose processors, system on chip (SOC), a central processing unit, a graphics processing unit, a processor created through an Application Specific Integrated Circuit (ASIC), or combinations thereof. Memory 810 can include Read Only Memory (ROM), volatile memory, and non-volatile memory, or combinations thereof, coupled to the bus using techniques known in the art. Sensors 816 can include an IMU and/or one or more cameras (e.g., RGB camera, RGBD camera, depth camera, etc.) or other sensors described herein. The audio processing system can further include a display 814 (e.g., an HMD, or touchscreen display).

Memory 810 can be connected to the bus and can include DRAM, a hard disk drive or a flash memory or a magnetic optical drive or magnetic memory or an optical drive or other types of memory systems that maintain data even after power is removed from the system. In one aspect, the processor 804 retrieves computer program instructions stored in a machine readable storage medium (memory) and executes those instructions to perform operations described herein.

Audio hardware, although not shown, can be coupled to the one or more buses in order to receive audio signals to be processed and output by speakers 808. Audio hardware can include digital to analog and/or analog to digital converters. Audio hardware can also include audio amplifiers and filters. The audio hardware can also interface with microphones 806 (e.g., microphone arrays) to receive audio signals (whether analog or digital), digitize them when appropriate, and communicate the signals to the bus.

Communication module 812 can communicate with remote devices and networks through a wired or wireless interface. For example, communication module can communicate over known technologies such as TCP/IP, Ethernet, Wi-Fi, 3G, 4G, 5G, Bluetooth, ZigBee, or other equivalent technologies. The communication module can include wired or wireless transmitters and receivers that can communicate (e.g., receive and transmit data) with networked devices such as servers (e.g., the cloud) and/or other devices such as remote speakers and remote microphones.

It will be appreciated that the aspects disclosed herein can utilize memory that is remote from the system, such as a network storage device which is coupled to the audio processing system through a network interface such as a modem or Ethernet interface. The buses can be connected to each other through various bridges, controllers and/or adapters as is well known in the art. In one aspect, one or more network device(s) can be coupled to the bus. The network device(s) can be wired network devices (e.g., Ethernet) or wireless network devices (e.g., Wi-Fi, Bluetooth). In some aspects, various aspects described (e.g., simulation, analysis, estimation, modeling, object detection, etc.,) can be performed by a networked server in communication with the capture device.

Various aspects described herein may be embodied, at least in part, in software. That is, the techniques may be carried out in an audio processing system in response to its processor executing a sequence of instructions contained in a storage medium, such as a non-transitory machine-readable storage medium (e.g. DRAM or flash memory). In various aspects, hardwired circuitry may be used in combination with software instructions to implement the techniques described herein. Thus the techniques are not limited to any specific combination of hardware circuitry and software, or to any particular source for the instructions executed by the audio processing system.

In the description, certain terminology is used to describe features of various aspects. For example, in certain situations, the terms 'module', 'processor', 'unit', 'renderer', 'system', 'device', 'filter', 'reverberator', 'estimator', 'classifier', 'block', 'selector', 'simulation', 'model', and 'component', are representative of hardware and/or software configured to perform one or more processes or functions. For instance, examples of "hardware" include, but are not limited or restricted to an integrated circuit such as a processor (e.g., a digital signal processor, microprocessor, application specific integrated circuit, a micro-controller, etc.). Thus, different combinations of hardware and/or software can be implemented to perform the processes or functions described by the above terms, as understood by one skilled in the art. Of course, the hardware may be alternatively implemented as a finite state machine or even combinatorial logic. An example of "software" includes executable code in the form of an application, an applet, a routine or even a series of instructions. As mentioned above, the software may be stored in any type of machine-readable medium.

Some portions of the preceding detailed descriptions have been presented in terms of algorithms and symbolic representations of operations on data bits within a computer memory. These algorithmic descriptions and representations are the ways used by those skilled in the audio processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined or removed, performed in parallel or in serial, as desired, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination hardware devices and software components.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

While certain aspects have been described and shown in the accompanying drawings, it is to be understood that such aspects are merely illustrative of and not restrictive, and the disclosure is not limited to the specific constructions and arrangements shown and described, since various other modifications may occur to those of ordinary skill in the art.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method, performed by a processor of a device, comprising:

determining one or more acoustic parameters of a current acoustic environment of a user, based on sensor signals captured by one or more sensors of the device;

determining one or more preset acoustic parameters based on both 1) the one or more acoustic parameters of the current acoustic environment of the user and 2) an acoustic environment of an audio file comprising audio signals, the acoustic environment of the audio file being determined based on the audio signals of the audio file or metadata of the audio file;

spatially rendering the audio signals by applying the one or more preset acoustic parameters to the audio signals, resulting in binaural audio signals; and driving speakers with the binaural audio signals.

2. The method of claim 1, wherein determining the one or more preset acoustic parameters includes selecting the one or more preset acoustic parameters to increase resemblance to the acoustic environment of the audio file in response to the acoustic environment of the audio file being an outdoor scene.

3. The method of claim 1, wherein determining the one or more preset acoustic parameters includes selecting the one or more preset acoustic parameters to increase resemblance to the acoustic environment of the audio file in response to an indicator in the metadata.

4. The method of claim 1, wherein determining the one or more preset acoustic parameters includes selecting acoustic parameters that are specified in the metadata as the one or more preset acoustic parameters in response to the acoustic parameters being present or indicated by a control in the metadata.

5. The method of claim 1, wherein determining the one or more preset acoustic parameters includes selecting the one or more preset acoustic parameters to increase resemblance to the current acoustic environment of the user in response to the acoustic environment of the audio file being indoors or non-existent.

6. The method of claim 1, wherein determining the one or more preset acoustic parameters includes selecting the one or more preset acoustic parameters to increase resemblance to the acoustic environment of the audio file, in response to the audio file being associated with a visual work.

7. The method of claim 1, wherein determining the one or more preset acoustic parameters includes selecting the one or more preset acoustic parameters to increase resemblance to the current acoustic environment of the user in response to the audio file not being associated with a visual work.

8. The method of claim 1, wherein determining the one or more preset acoustic parameters includes classifying the acoustic environment of the audio file and selecting the one or more preset acoustic parameters as a balance between the acoustic environment of the audio file and the one or more acoustic parameters of a current acoustic environment of a user.

9. The method of claim 1, wherein determining the acoustic environment of the audio file includes extracting content-based acoustic parameters from the audio signals of the audio file or from the metadata.

10. The method of claim 1, wherein the acoustic environment of the audio file is classified as at least one of: a room volume, being in an open space, or being in an enclosed space.

11. A system, comprising:

a microphone generating a microphone signal that characterizes an acoustic environment of the system; and non-transitory computer-readable memory storing executable instructions and a processor configured to execute the instructions to cause the system to:

determine one or more acoustic parameters of the acoustic environment of the system, including at least a reverberation duration, based on the microphone signal;

determine one or more preset acoustic parameters based on both 1) the one or more acoustic parameters of the acoustic environment of the system and 2) an acoustic environment of an audio file that is determined based on audio signals of the audio file or metadata of the audio file;

spatially render the audio signals comprising applying the one or more preset acoustic parameters to the audio signals, resulting in spatialized audio signals; and drive speakers with the spatialized audio signals.

12. The system of claim 11, wherein the system includes a headphone set on which the microphone and the speakers are integrated.

13. The system of claim 11, wherein the acoustic environment of the audio file is classified as a type of space, including: a room, a library, a cathedral, a stadium.

14. The system of claim 11, wherein determining the acoustic environment of an audio file is further based on a video signal associated with the audio file.

15. The system of claim 11, wherein determining the one or more acoustic parameters of the acoustic environment of the system or determining acoustic parameters based on the audio signals of the audio file are performed using a machine-learning model.

16. The system of claim 11, wherein determining the one or more acoustic parameters of the acoustic environment of the system or determining acoustic parameters based on the audio signals of the audio file are performed using a digital signal processing algorithm including at least one of a blind room estimation algorithm, beamforming, or a frequency domain adaptive filter (FDAF).

17. The system of claim 11, further comprising storing the one or more acoustic parameters of the acoustic environment of the system, and re-using the stored one or more acoustic parameters of current acoustic environment at a later time, in response to sensing the acoustic environment of the system at the later time.

18. The system of claim 11, wherein determining the one or more preset acoustic parameters is performed using a rule-based algorithm that includes a content-type, an audio scene type, and the one or more acoustic parameters of the acoustic environment of the system.

19. The system of claim 11, wherein determining the one or more preset acoustic parameters is performed using a machine learning model that includes a content-type, an audio scene type, and the one or more acoustic parameters of the acoustic environment of the system.

20. The system of claim 11, wherein the one or more acoustic parameters and the one or more preset acoustic parameters includes at least one of a reverberation time, a measure of reverberation time, a direct to reverberant ration (DRR), reflection density, envelopment, or speech clarity.

* * * * *